US012132731B2

(12) United States Patent
Sholtis et al.

(10) Patent No.: US 12,132,731 B2
(45) Date of Patent: *Oct. 29, 2024

(54) SYSTEM AND METHOD TO FACILITATE AN ACCOUNT PROTECTION CHECK FOR SETS OF CREDENTIALS

(71) Applicants: Steven Sholtis, Hampstead, NC (US); Bill Hudson, Hampstead, NC (US); David Hazar, Draper, UT (US)

(72) Inventors: Steven Sholtis, Hampstead, NC (US); Bill Hudson, Hampstead, NC (US); David Hazar, Draper, UT (US)

( * ) Notice: Subject to any disclaimer, the term of this patent is extended or adjusted under 35 U.S.C. 154(b) by 232 days.

This patent is subject to a terminal disclaimer.

(21) Appl. No.: 17/710,738

(22) Filed: Mar. 31, 2022

(65) Prior Publication Data

US 2022/0224688 A1 Jul. 14, 2022

Related U.S. Application Data

(63) Continuation-in-part of application No. 17/207,411, filed on Mar. 19, 2021, now Pat. No. 11,615,180.
(Continued)

(51) Int. Cl.
*H04L 29/06* (2006.01)
*H04L 9/40* (2022.01)

(52) U.S. Cl.
CPC ...... *H04L 63/0884* (2013.01); *H04L 63/0853* (2013.01); *H04L 63/102* (2013.01); *H04L 63/20* (2013.01)

(58) Field of Classification Search
CPC ....... G06F 21/31; G06F 21/45; H04L 63/083; H04L 63/10
See application file for complete search history.

(56) References Cited

U.S. PATENT DOCUMENTS 6,067,568 A * 5/2000 Li .................. H04L 41/0843
709/223
7,797,734 B2 * 9/2010 Babi .................. H04L 63/08
726/4
(Continued)

FOREIGN PATENT DOCUMENTS

WO WO2009007188 A1 1/2009

OTHER PUBLICATIONS

Disabling Credentials, Retrieved from Broadcom, Retrieved on Mar. 6, 2020 <URL: https://techdocs.broadcom.com/us/en/symantec-security-software/identity-security/advanced-authentication/9-0/building/ca-strong-authentication-web-services-information/performing-credential-operations/disabling-credentials.html>.
(Continued)

*Primary Examiner* — Dao Q Ho

(57) ABSTRACT

A system and a method are provided for facilitating an account protection check for the security of sets of credentials. The system and method allow a service provider to automatically lock a credential set of at least one user account if fraudulent activity is detected. A third-party server of a service provider requests a token from the system before the authentication process. User metadata is analyzed to detect potentially fraudulent activity from the user account. If the credential set is in a locked status or unlocked status, at least one remote server of the system respectively relays an invalidation token or a validation token to the third-party server. If the invalidation token is relayed to the third-party server, the service provider does not go through the authentication process. If the validation token is relayed to the third-party server, the service provider proceeds with the authentication process as standard procedure.

17 Claims, 18 Drawing Sheets

Related U.S. Application Data

(60) Provisional application No. 62/991,990, filed on Mar. 19, 2020.

(56) References Cited

U.S. PATENT DOCUMENTS

| | | | |
|---|---|---|---|
| 2007/0101411 A1* | 5/2007 | Babi | H04L 63/18 726/4 |
| 2009/0019514 A1* | 1/2009 | Hazlewood | H04L 63/0281 726/1 |
| 2020/0213334 A1* | 7/2020 | Kutner | H04L 63/1416 |
| 2022/0172303 A1* | 6/2022 | Handy Bosma | H04W 4/023 |

OTHER PUBLICATIONS

Cancel, pause, or change a subscription on Google Play, Retrieved from Google Retrieved on Mar. 6, 2020 <URL: https://support.google.com/googleplay/answer/7018481?co=GENIE.Platform%3DAndroid&hl=en>.

Nextlevel3, Retrieved from Internet, Retrieved on Mar. 6, 2020 <URL: https://www.nextlevel3.com/>.

* cited by examiner

SYSTEM AND METHOD TO FACILITATE AN ACCOUNT PROTECTION CHECK FOR SETS OF CREDENTIALS

The current application is a continuation-in-part (CIP) application of a U.S. non-provisional application Ser. No. 17/207,411 filed on Mar. 19, 2021. The U.S. non-provisional application Ser. No. 17/207,411 claims a priority to a U.S. provisional application Ser. No. 62/991,990 filed on Mar. 19, 2020.

FIELD OF THE INVENTION

The present invention relates generally to data processing and account security. More specifically, the present invention is systems and methods to facilitate the validation of sets of credentials to grant access to secure accounts.

BACKGROUND OF THE INVENTION

Username/Password credential validation methods are the most commonly used authentication methods on the Internet. Almost all online services, sites, applications, and processes rely on the validation of credentials prior to authorizing access to resources. The services, applications, and other interfaces rely on authentication prior to granting access; therefore, these systems keep tracking authentication requests continuously. This often leaves these systems open to receive requests for credential validation outside of predetermined parameters the actual owner of the credentials original intended. Therefore, there is a need for improved systems and methods to facilitate the validation of sets of credentials that may overcome one or more of the above-mentioned problems and/or limitations.

The present invention provides a system and method for facilitating the validation of sets of credentials using an account protection check. The present invention allows a user to lock or unlock sets of credentials to further control access to one or more accounts. Before a service provider goes through an authentication process, the service provider requests a token from the service provided by the present invention. In addition, the service provider performs an automatic account protection check which analyses the validity of the request to ensure that the set of credentials has not been compromised. Based on if the credential set is in a locked or unlocked status, the present invention relays an invalidation token or a validation token to the service provider, respectively. If the invalidation token is relayed to the service provider, the service provider does not go through the authentication process. If the validation token is relayed to the service provider, the service provider proceeds with the authentication process.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

According to some embodiments, a method for facilitating an account protection check for sets of credentials is disclosed. Accordingly, the method may include a step of receiving, using a communication device, a login request associated with at least one user from a resource owner. The method may include a step of analyzing, using a processing device, the login request. The login request may be analyzed utilizing user metadata to validate the authenticity of the login request. Further, the method may include a step of retrieving, using a storage device, a preauthorized token from the resource owner. In addition, the method may include a step of validating, using the processing device, the credential set state associated with the at least one user. The method may also include a step of generating, using the processing device, a token response associated with the credential set state. Further, the method may include a step of transmitting, using the communication device, the token response to the resource owner.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

DETAIL DESCRIPTIONS OF THE INVENTION

All illustrations of the drawings are for the purpose of describing selected versions of the present invention and are not intended to limit the scope of the present invention.

Figure 1:
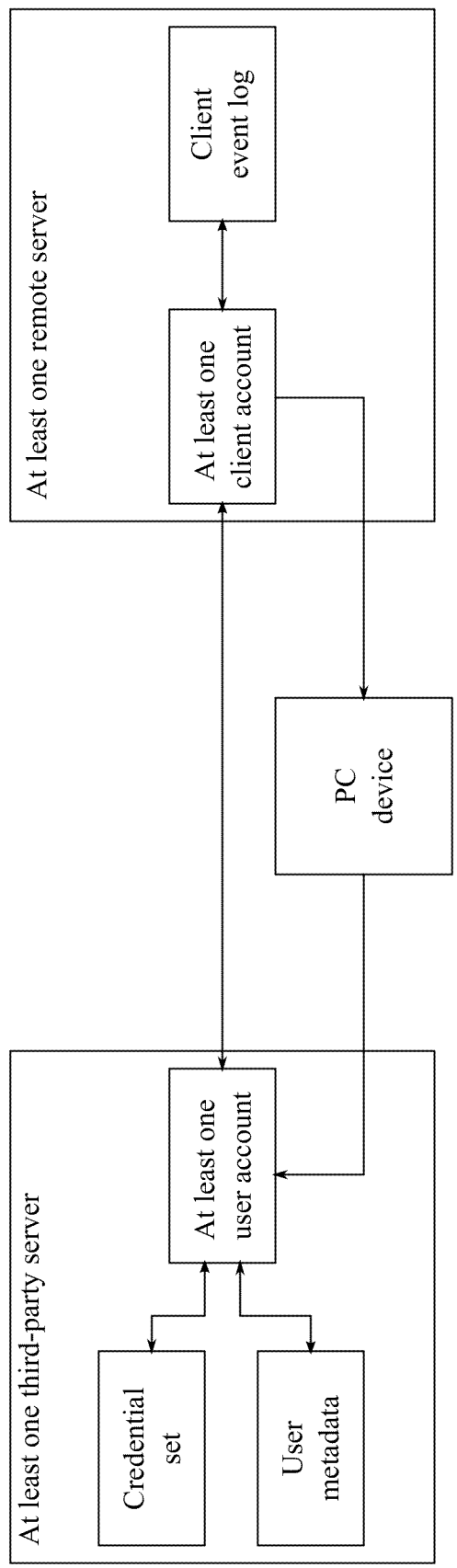
FIG. 1 is a block diagram for the system of the present invention.

In reference to FIG. 1, the present invention provides a system and method for facilitating an account protection check for sets of credentials. More specifically, the present invention automatically performs an account protection check when the user desires to access one or more accounts based on the activities of the user during the login request. The account protection check provides greater security to the accounts in addition to the set of credentials lock status. For example, if the login request is performed from a foreign location or a computing device not usually utilized by the user, the login request will be automatically blocked to prevent an unwanted party from hacking the certain user account. With reference to FIG. 1, the system of the present invention includes at least one remote server that manages at least one client account and a client event log (Step A). The client account is associated with a corresponding personal computing (PC) device such as, but not limited to, a desktop computer, a notebook computer, a smartphone, or a mobile tablet. The remote server is a computing node where information provided by the client account is processed and stored. The client event log is a compilation of metadata that is used to form a profile of the user to further validate the login request when the user is trying to access the client account.

Additionally, the system of the present invention includes at least one third-party server that manages at least one user account and the user metadata (Step B). The user account is associated with the corresponding PC device, and the user account includes a credential set. The credential set allows the user to access the user account and thus use the service provided by the third-party server. In more detail, the credential set can be a username and password that the user must enter correctly in order to access the user account. Moreover, the credential set can be associated with a credential token that allows the user to quickly access the user account with biometric or facial information. Alternatively, the credential can be associated with a credential key. For example, the credential token can be any type of credential token such as, but not limited to, a facial identification token or a touch identification token. The user metadata includes data regarding the corresponding PC device, the usual geographic location of the user, and the usual timing when the user access the client account. By using the client event log for each account protection check, several patterns, rules, and machine learning algorithms can be leveraged to recognize, isolate, block, and/or alert on ingress calls from potential fraudulent actors automatically. The third-party server is a computing node that processes and stores information provided by the user account. Moreover, the third-party server is a computing node that is associated with a third-party service such as, but not limited to, an email service, an electronic vehicle entry service, a building access service, a computer operating system, or an Internet of Things (IoT) network. Further, the user account is associated with the client account, and the credential set is either in an unlocked or a locked status. The user account and the client account are linked so that the user can access the resources associated with the client account. The unlocked status or the locked status can be toggled by the user, or the user can grant the service provider of the third-party server the ability to toggle the credential set between the unlocked or locked status for security purposes.

Figure 2:
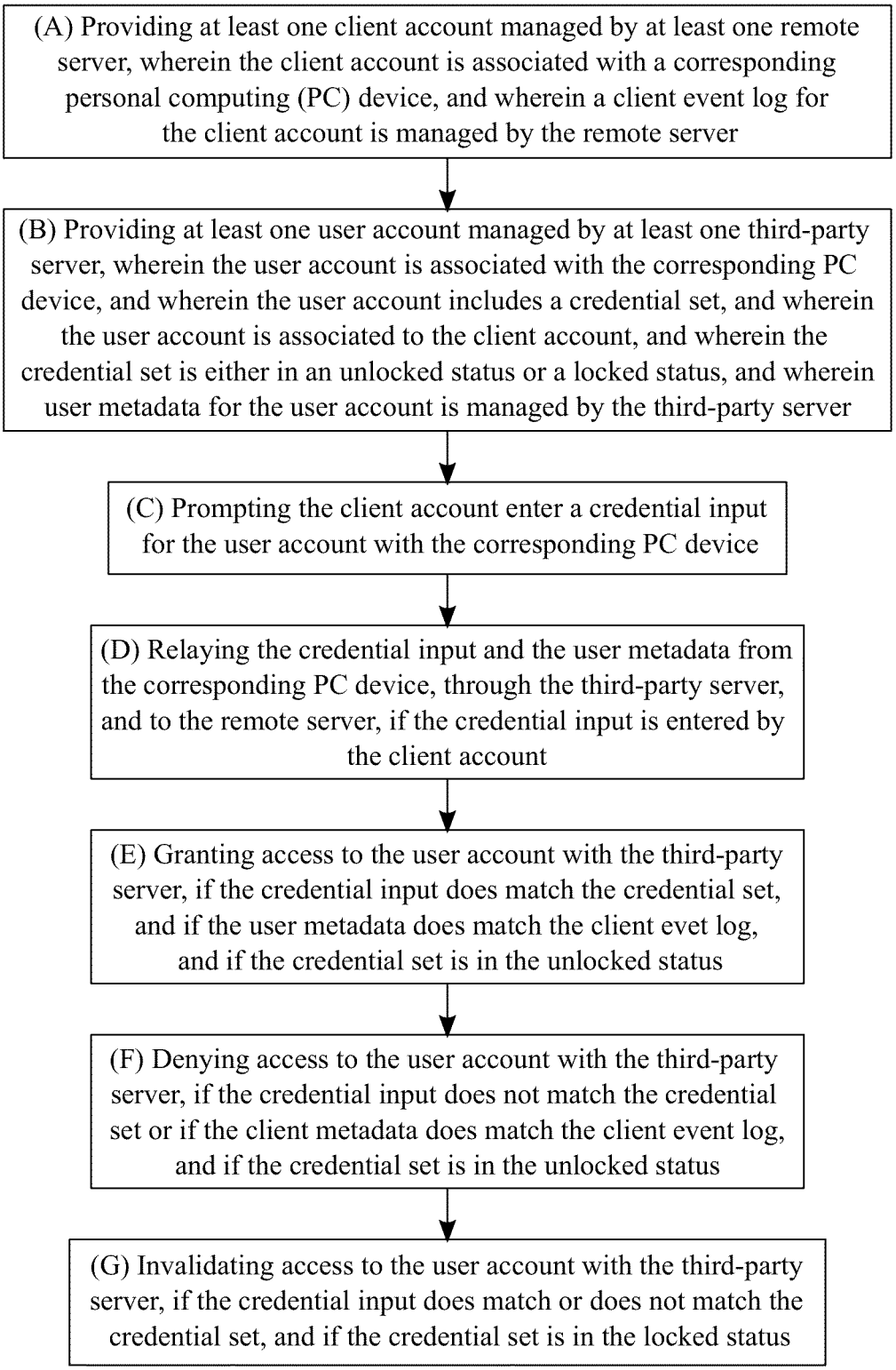
FIG. 2 is a flowchart illustrating the overall process for the method of the present invention.

With reference to FIG. 2, the method of the present invention follows an overall process for facilitating the security for sets of credentials. The corresponding PC device prompts the client account to enter a credential input for the user account (Step C). More specifically, the client account is prompted to enter a username and password or to use a facial or biometric data in order to access the service provided by the third-party server. The credential input and the user metadata are relayed from the corresponding PC device, through the third-party server, and to the remote server, if the credential input is entered by the client account (Step D). In further detail, the credential input is received by the third-party server for an authentication process. Simultaneously, the user metadata is also analyzed to verify that the user entering the credential input is the owner of the client account. For example, the IP address of the corresponding PC device is looked up and compared with the usual IP addresses the owner of the client account has accessed the client account. However, before the credential input is authenticated, the credential input is sent to the remote server in order to check if the credential set is in the unlocked or locked status. The third-party server grants access to the user account, if the credential input does match the credential set, if the user metadata does match the client event log, and if the credential set is in the unlocked status (Step E). In further detail, the remote server validates the credential set because the credential set is in the unlocked status and the user metadata matches the stored data in the client event log. Therefore, the third-party server can proceed with the authentication process. Further, the third-party server authenticates the credential input because the credential input matches the credential set, and, thus, the user can access the service provided by the third-party account.

Alternatively, in reference to FIG. 2, the third-party server denies access to the user account, if the credential input does not match the credential set or if the client metadata does match the client event log, and if the credential set in in the unlocked status (Step F). Similar to Step E, the remote server validates the credential set because the credential set is in the unlocked status in order for the third-party server to proceed with the authentication process. However, the third-party server fails to authenticate the credential input because the credential set does not match the credential set, even if the user metadata does match the client event log. For example, the password may have not been correct, or the facial or biometric data respectively did not match the credential token or key. In some cases, the user metadata analysis may result in inconsistencies, such as the user may be trying to access the client account from a foreign country, or the corresponding PC device may not be recognized. The third-party server follows standard authentication procedure by prompting to reenter the credential input or to go through an account recovery process. The third-party server may also request the user to confirm the identity of the user using authentication methods such as multi-factor authentication in case the user is the owner of the client account performing new actions when trying to access the client account. As another alternative result, the third-party server invalidates access to the user account, if the credential set does or does not match the credential set, and if the credential set is in the locked status (Step G). In further detail, the remote server invalidates the credential set because the credential set is in the locked status. This prevents the third-party server from proceeding with the authentication process, even if the credential input is correct and the user metadata analysis does not result in any inconsistencies with the client event log. Instead of going through the authentication process, the third-party server invalidates access to the user account by providing an error message or error website page to the user. Thus, an unwanted user cannot attempt to hack the user account when the credential set is in the locked status.

Figure 3:
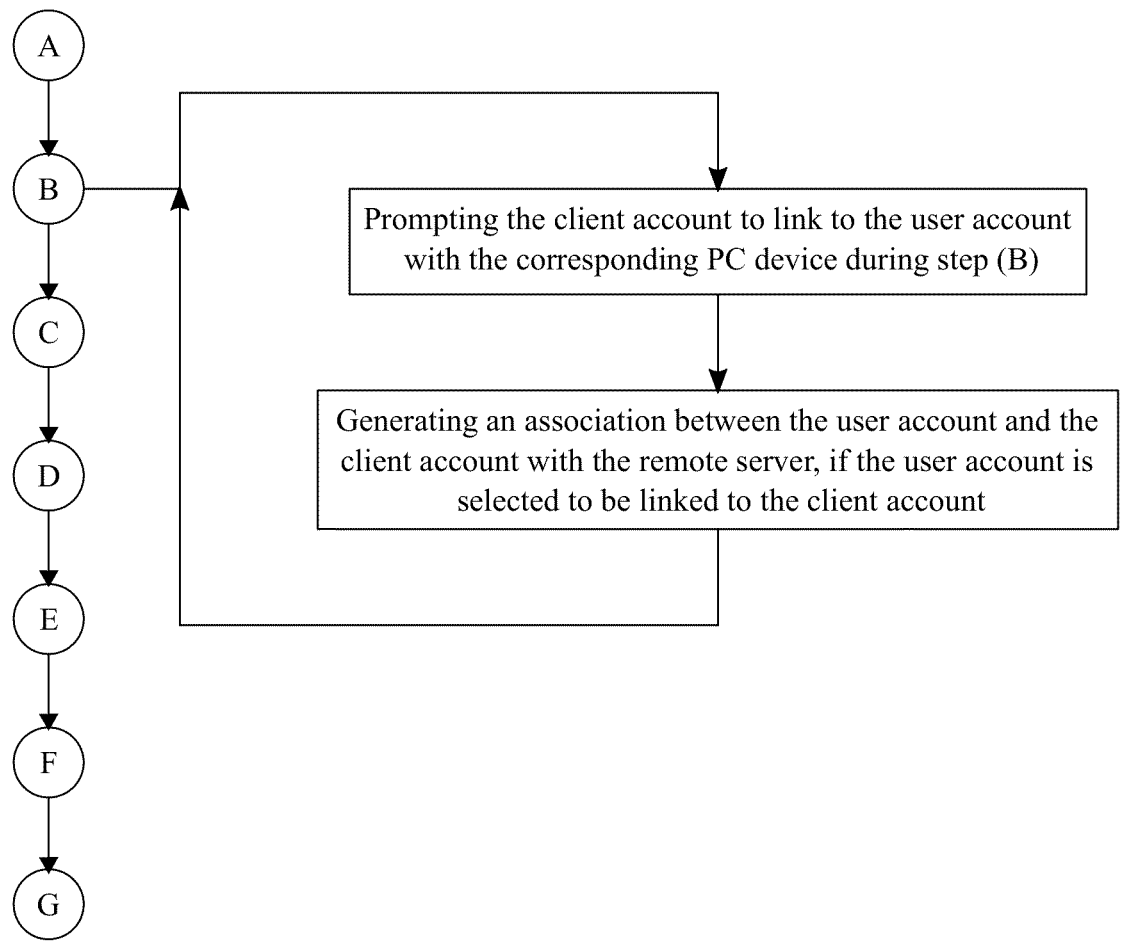
FIG. 3 is a flowchart illustrating the subprocess of linking a user account to the client account.

In order for the user to link the user account with the client account and with reference to FIG. 3, the following subprocess is executed. The corresponding PC device prompts the client account to link to the user account. In more detail, the user is prompted to link one or more user accounts from various third-party services. This can be executed in various conditions. For example, the user can be prompted to link an existing user account for a service to the client account or the user can be prompted to link a new user account for a service to the client account during the account creation process hosted by the third-party server. The remote server generates an association between the user account and the client account, if the user account is selected to be linked to the client account. Simultaneously, the user metadata is collected to start generating the user profile by using the client event log. The association between the user account and the client account allows the remote server to validate or invalidate the credential set depending on if the credential set is in the unlocked status or the locked status. Further, the association between the user account and the client account provides the user the ability to unlock or lock the credential set.

Figure 4:
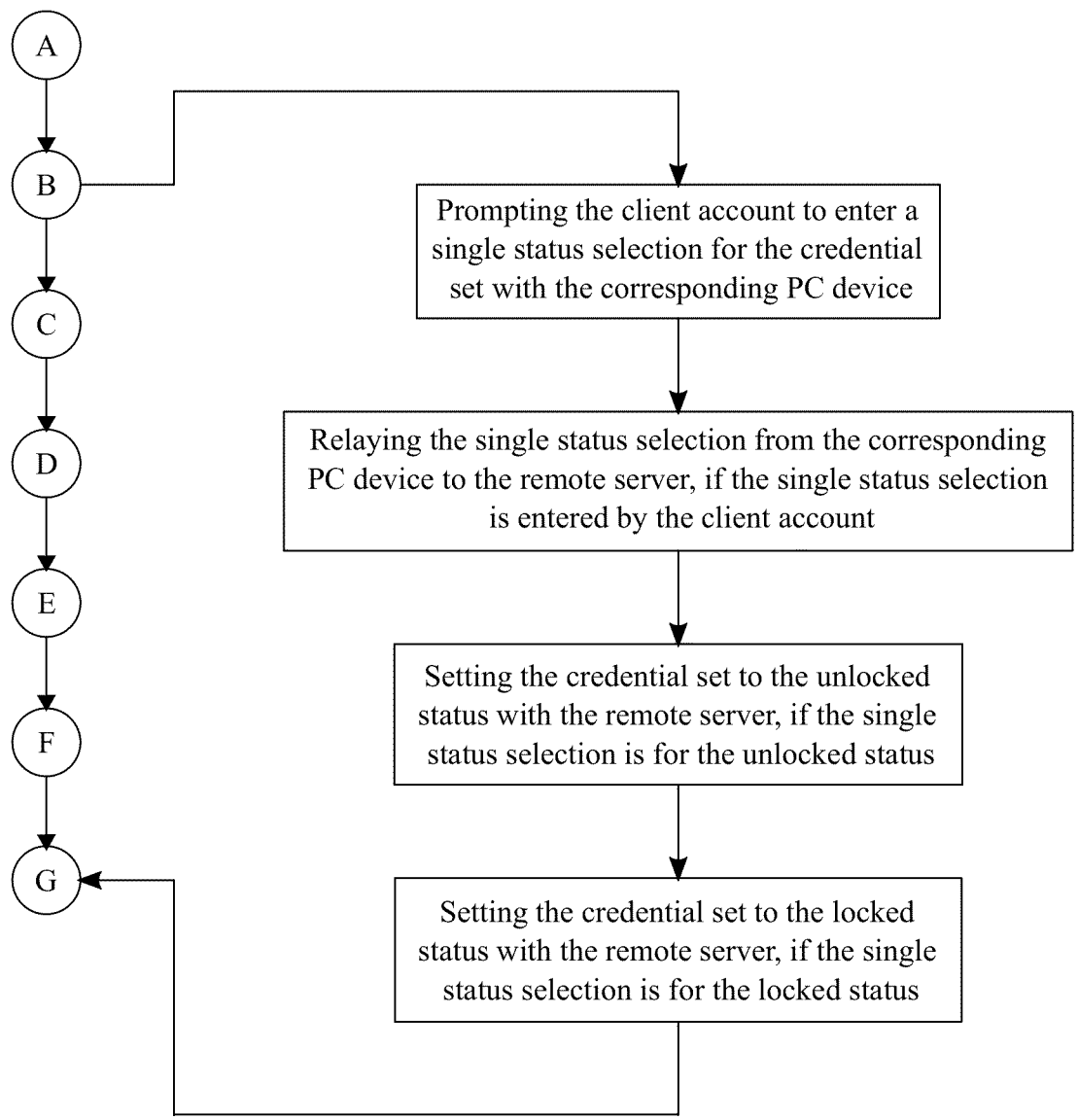
FIG. 4 is a flowchart illustrating the subprocess of toggling between the unlocked status or the locked status for the credential set.

In order for the user to toggle between the unlocked or locked status for the credential set and with reference to FIG. 4, the following subprocess is executed. The corresponding PC device prompts the client account to enter a single status selection for the credential set. In further detail, the single status selection is an input to toggle the credential set to either the unlocked status or the locked status. The single status selection is relayed from the corresponding PC device to the remote server, if the single status selection is entered by the client account. Thus, the remote server is instructed to toggle the status of the credential set based on the single status selection. The remote server sets the credential set to the unlocked status, if the single status selection is for the unlocked status. Thus, the user can toggle the credential set from the locked status to the unlocked status as desired to prevent unauthorized access. Alternatively, the remote server sets the credential set to the locked status, if the single status selection is for the locked status. Thus, the user can toggle the credential set from the unlocked status to the locked status. Simultaneously, the user metadata is collected to improve the accuracy of the user profile by using the client event log.

Figure 5:
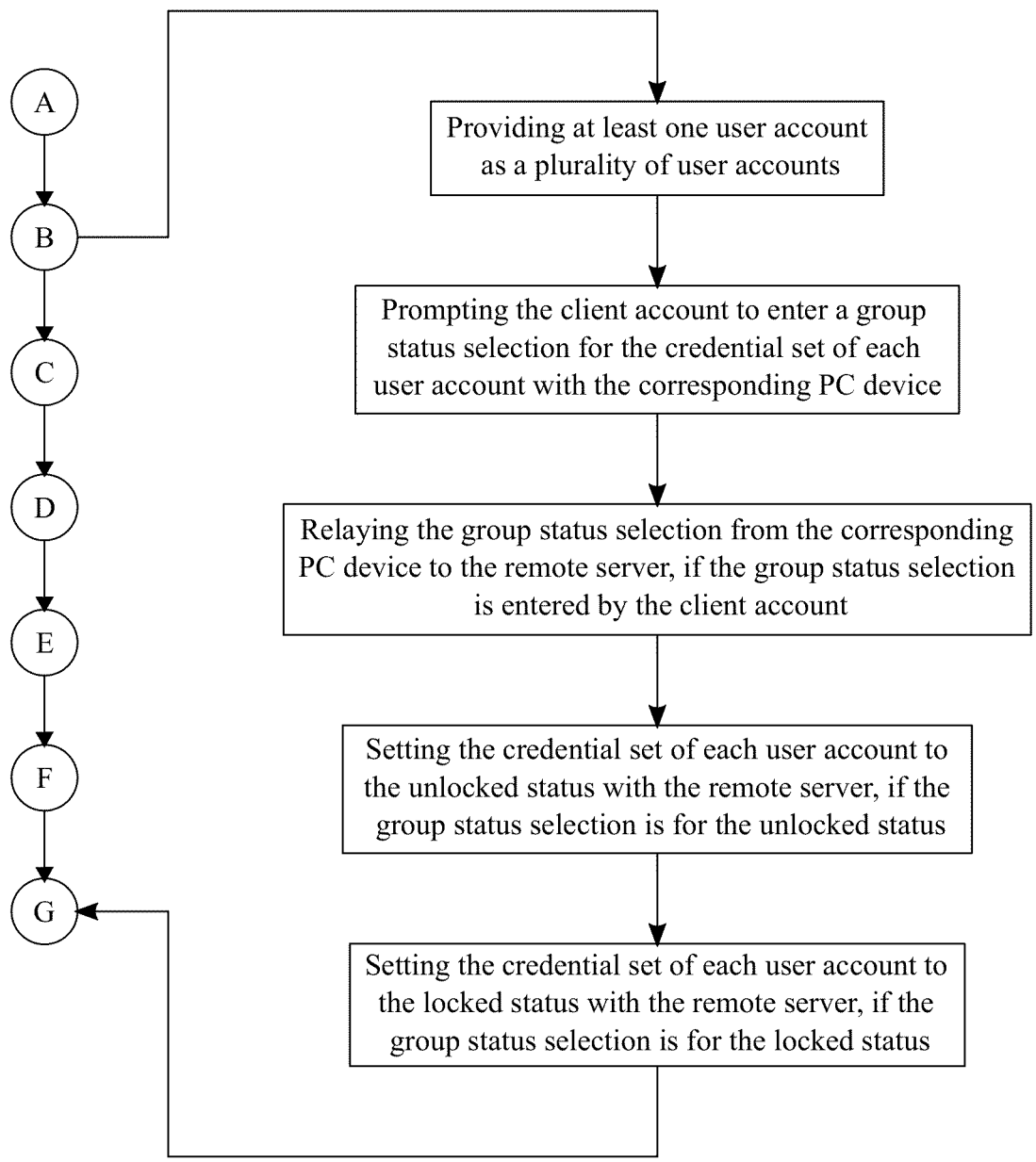
FIG. 5 is a flowchart illustrating the subprocess of toggling between the unlocked status or the locked status for at least two or all of the credential sets for a plurality of user accounts.

In order for the user to toggle between the unlocked status or the locked status for at least two or all of the credential sets for a plurality of user accounts and with reference to FIG. 5, the following subprocess is executed. The at least one user account is provided as a plurality of user accounts. The corresponding PC device prompts the client account to enter a group status selection for the credential set for each user account. In further detail, the group status selection is an input to toggle at least two or all of the credential sets for the plurality of user accounts to either the unlocked status or the locked status. The group status selection is relayed from the corresponding PC device to the remote server, if the group status selection is entered by the client account. Thus, the remote server is instructed to toggle the status of at least two or all of the credential sets based on the group status selection. The remote server sets the credential set of each user account to the unlocked status, if the group status selection is for the unlocked status. Thus, the user can toggle at least two or all of the credential sets for the plurality of user accounts from the locked status to the unlocked status. Alternatively, the remote server sets the credential set of each user account to the locked status, if the group status selection is for the locked status. Thus, the user can toggle at least two or all of the credential sets for the plurality of user accounts from the unlocked status to the locked status. Likewise, the user metadata for each user account is collected to improve the accuracy of the user profile by using the client event log. The client event log includes metadata from the plurality of user accounts so that the user profile can validate the actions of the user for each of the user accounts.

Figure 6:
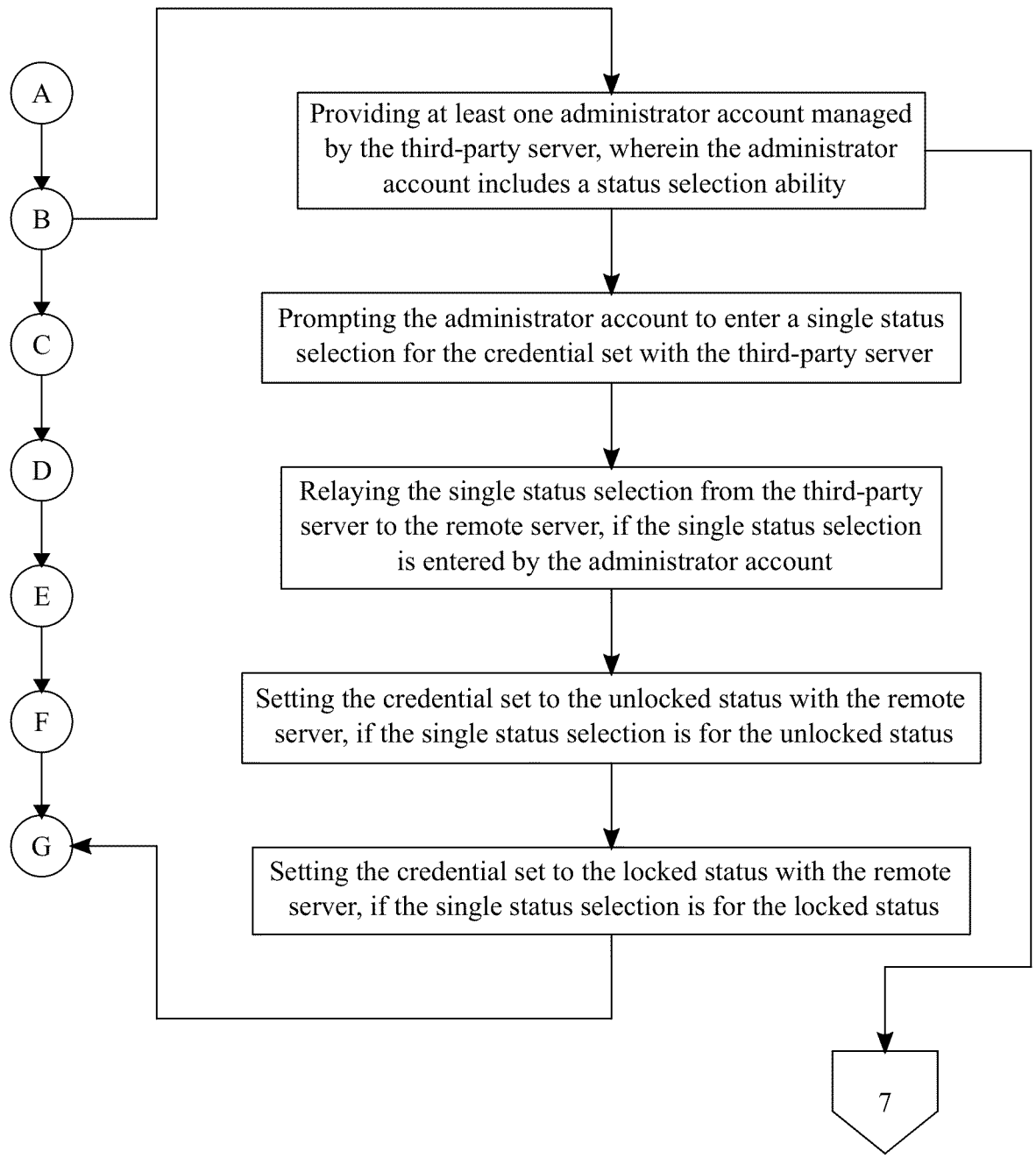
FIG. 6 is a flowchart illustrating the subprocess of an administrator account of the third-party server toggling between the unlocked status or the locked status for the credential set.

As mentioned previously and with reference to FIG. 6, the service provider of the third-party server can toggle between the unlocked status or the locked status for the credential set. This is executed through the following subprocess. The third-party server manages at least one administrator account that includes a status selection ability. The administrator account is the account used by the service provider in order manage the user account. The third-party server prompts the administrator account to enter a single status selection for the credential set so that the administrator account may adjust the single status of the credential set. In further detail, the single status selection is an input to toggle the credential set to either the unlocked status or locked status. The single status selection is relayed from the third-party server to the remote server, if the single status selection is entered by the administrator account. Thus, the remote server is instructed to toggle the status of the credential set based on the single status selection by the administrator account. The remote server sets the credential set to the unlocked status, if the single status selection is for the unlocked status. In more detail, if the user cannot personally toggle the credential set from the unlocked status to the locked status, the service provider of the third-party server can toggle the credential set to the unlocked status in order for the user to access the user account. Thus, the service provider can toggle the credential set from the locked status to the unlocked status. Alternatively, the remote server sets the credential set to the locked status, if the single status selection is for the locked status. In more detail, the service provider can automatically toggle the credential set to the locked status if the service provider notices any suspicious activity. To do so, the service provider utilizes the client event log to monitor any discrepancies in the user metadata to automatically detect suspicious activity. More specifically, the suspicious activity can be an unwanted user attempting to access the user account. Thus, the service provider can toggle the credential set from the unlocked status to the locked status to protect the client accounts.

Figure 7:
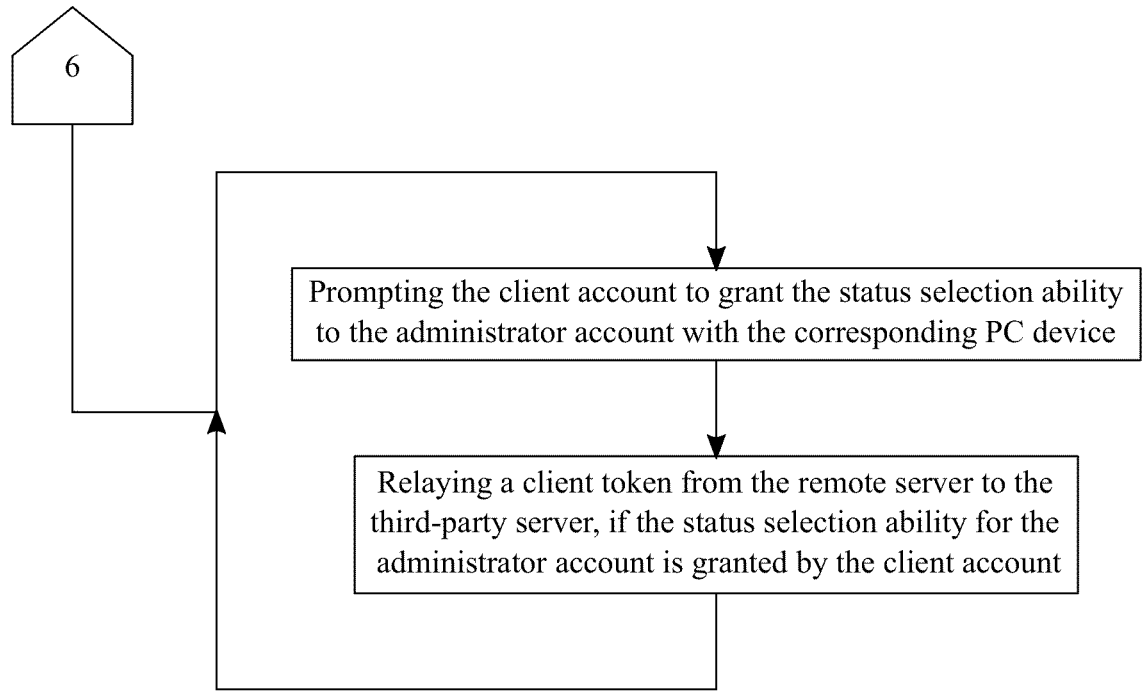
FIG. 7 is a flowchart illustrating the subprocess of the client account granting the status selection ability to the administrator account.

In order for the user to grant the status selection ability to the service provider and with reference to FIG. 7, the following subprocess is executed. The corresponding PC device prompts the client account to grant the status selection ability to the administrator account. This process is recommended when there is a high degree of trust between the user and the service provider, or if the service provider requires administrative access to the plurality of user accounts. For example, the relationship between the service provider and the user is for a device operating system or a highly privileged application service. Additionally, this process is also recommended when other authorization grant types such as, but not limited to, authorization codes are not provided by the service provider. A client token is relayed from the remote server to the third-party server, if the status selection ability for the administrator account is granted by the client account. With the client token, the service provider obtains the status selection ability, and thus, the service provider can toggle the credential set between the unlocked status or the locked status for each of the user accounts.

Figure 8:
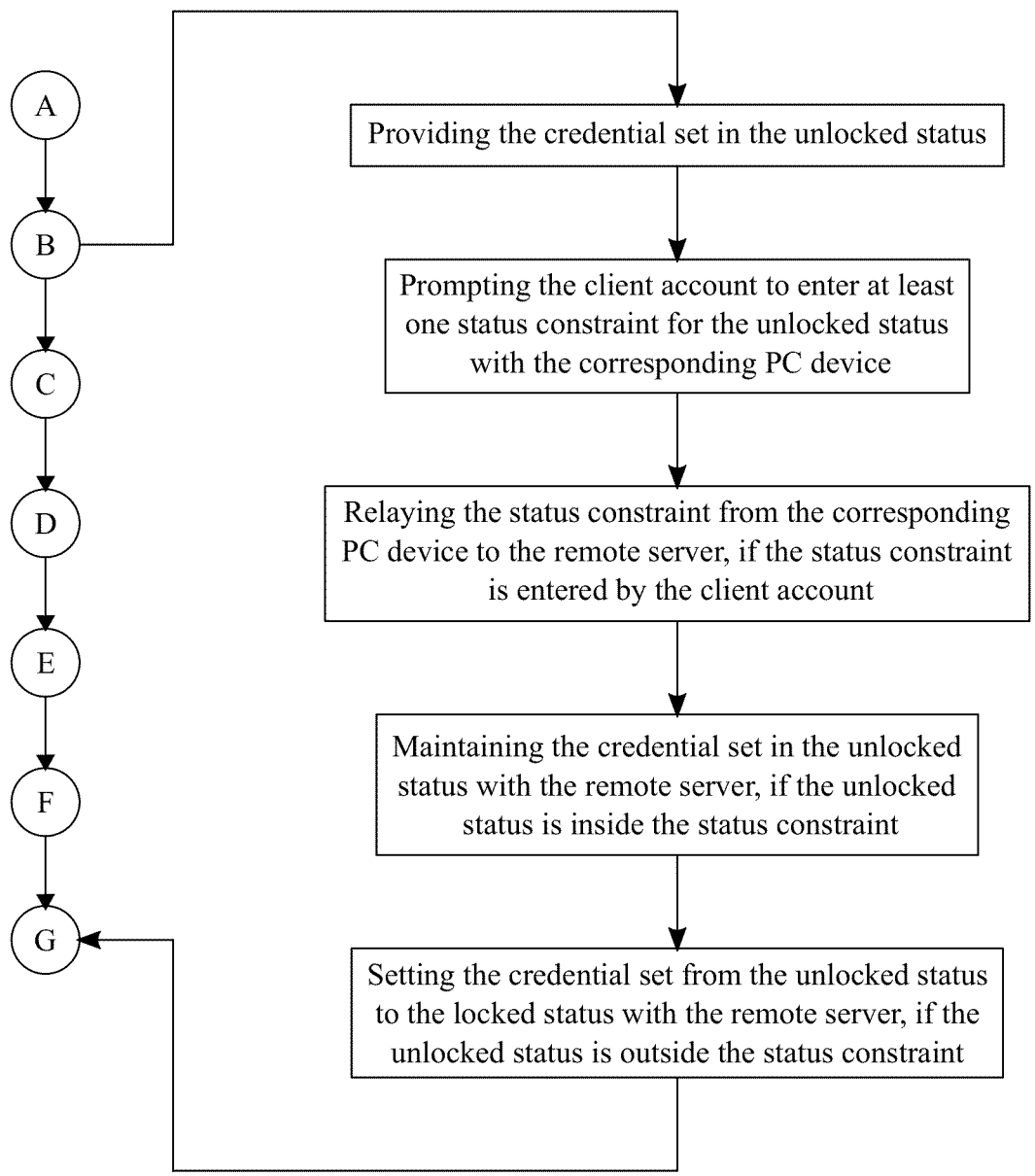
FIG. 8 is a flowchart illustrating the subprocess of applying a status constraint for the unlocked status of the credential set.

In order for the user to place a status constraint for the unlocked status of the credential set and with reference to FIG. 8, the following subprocess is executed. With the credential set already set to the unlocked status, the corresponding PC device prompts the client account to enter at least one status constraint for the unlocked status. The status constraint can be any type of constraint such as, but not limited to, a time-based constraint, a location-based constraint, or a subscription-based constraint. For example, if the status constraint is a time-based constraint, the user can set the credential set to be in the unlocked status for specified period of time. In another example, if the status constraint is a location-based constraint, the user can set the credential set to be in the unlocked status whenever the user is in a specified location. In further detail, a geofenced area may be generated, and the credential set would stay in the unlocked status or toggle to the unlocked status whenever the corresponding PC device is within or enters the generated geofenced area. This can be managed and monitored through a Global Navigation Satellite System (GNSS) device which may be provided with the corresponding PC device. Moreover, if the status constraint is a subscription-based constraint, the user can set the credential set to be in the unlocked status for as long as a subscription to a service is active. Simultaneously, the user metadata is collected to analyze the user actions based on the client event log to ensure that the status constraint choice matches the user profile. The status constraint is relayed from the corresponding PC device to the remote server, if the status constraint is entered by the client account. Thus, the remote server is prepared to set the status constraint for the unlocked status. The remote server maintains the credential set in the unlocked status, if the unlocked status in inside the status constraint. In further detail, the credential set remains in the unlocked status if a specified period of time is still ongoing, if the corresponding PC device is within a specified geofenced area, or if the subscription to a service is active. The remote server sets the credential set from the unlocked status to the locked status, if the unlocked status is outside the status constraint. In further detail, the credential set is toggled from the unlocked status to the locked status if the specified period of time has lapsed, if the corresponding PC device is outside a specified geofenced area, or if the subscription to a service is canceled or expired. Thus, the user is able to place a status constraint for the unlocked status of the credential set.

Figure 9:
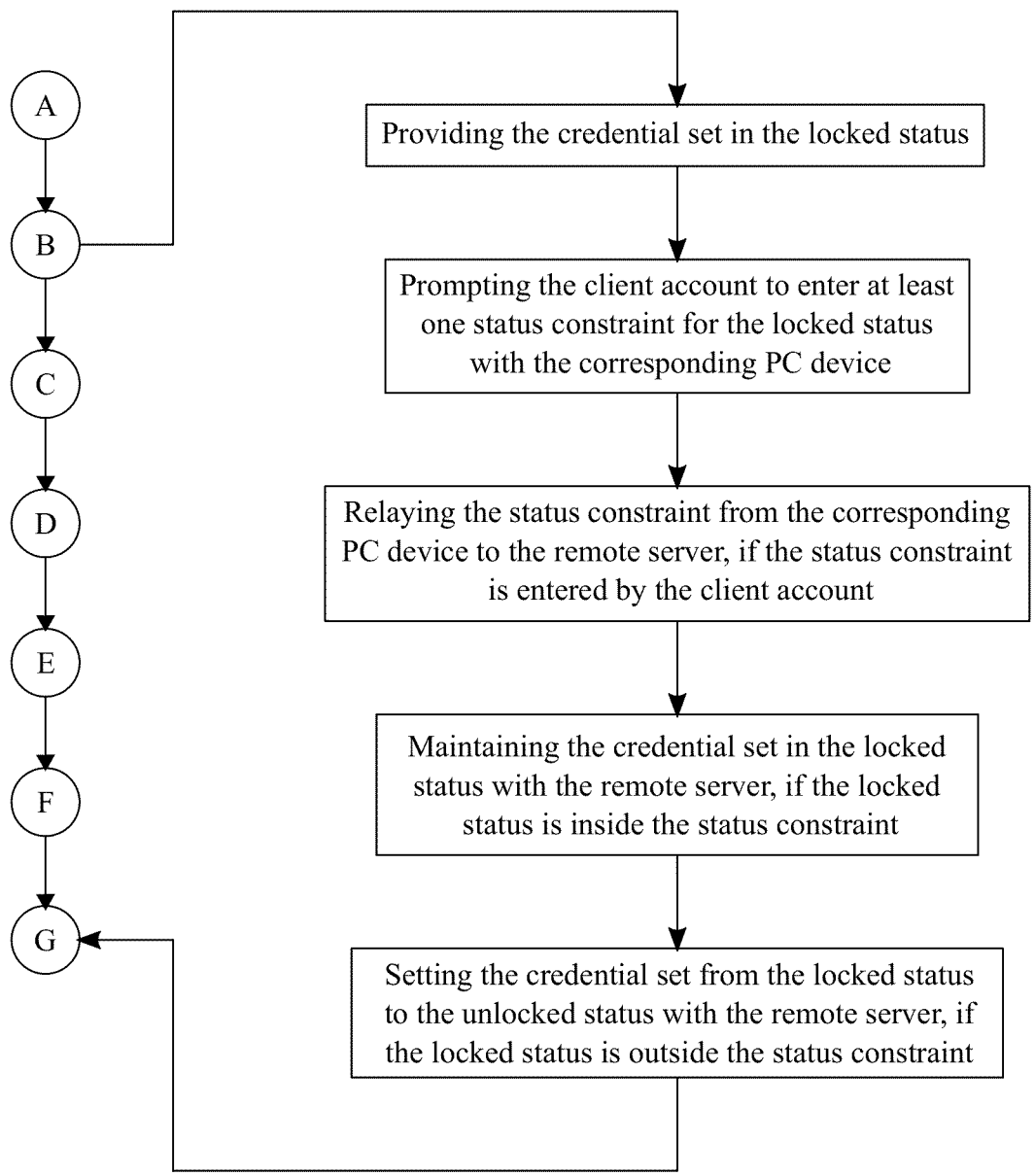
FIG. 9 is a flowchart illustrating the subprocess of applying a status constraint for the locked status of the credential set.

Alternatively, and with reference to FIG. 9, the user can place a status constraint for the locked status of the credential set through the following subprocess. With the credential set already set to the locked status, the corresponding PC device prompts the client account to enter at least one status constraint for the locked status. The status constraint can be any type of constraint such as those mentioned previously. Likewise, the user metadata is collected to analyze the user actions based on the client event log to ensure that the status constraint choice matches the user profile. The status constraint is relayed from the corresponding PC device to the remote server, if the status constraint is entered by the client account. Thus, the remote server is prepared to set the status constraint for the locked status. The remote server maintains the credential set in the locked status, if the locked status in inside the status constraint. In further detail, the credential set remains in the locked status if a specified period of time is still ongoing, if the corresponding PC device is within a specified geofenced area, or if the subscription to a service is inactive. The remote server sets the credential set from the unlocked status to the locked status, if the unlocked status is outside the status constraint. In further detail, the credential set is toggled from the locked status to the unlocked status if the specified period of time has lapsed, if the corresponding PC device is outside a specified geofenced area, or if the subscription to a service is reactivated. Thus, user is able to place a status constraint for the locked status of the credential set.

Figure 10:
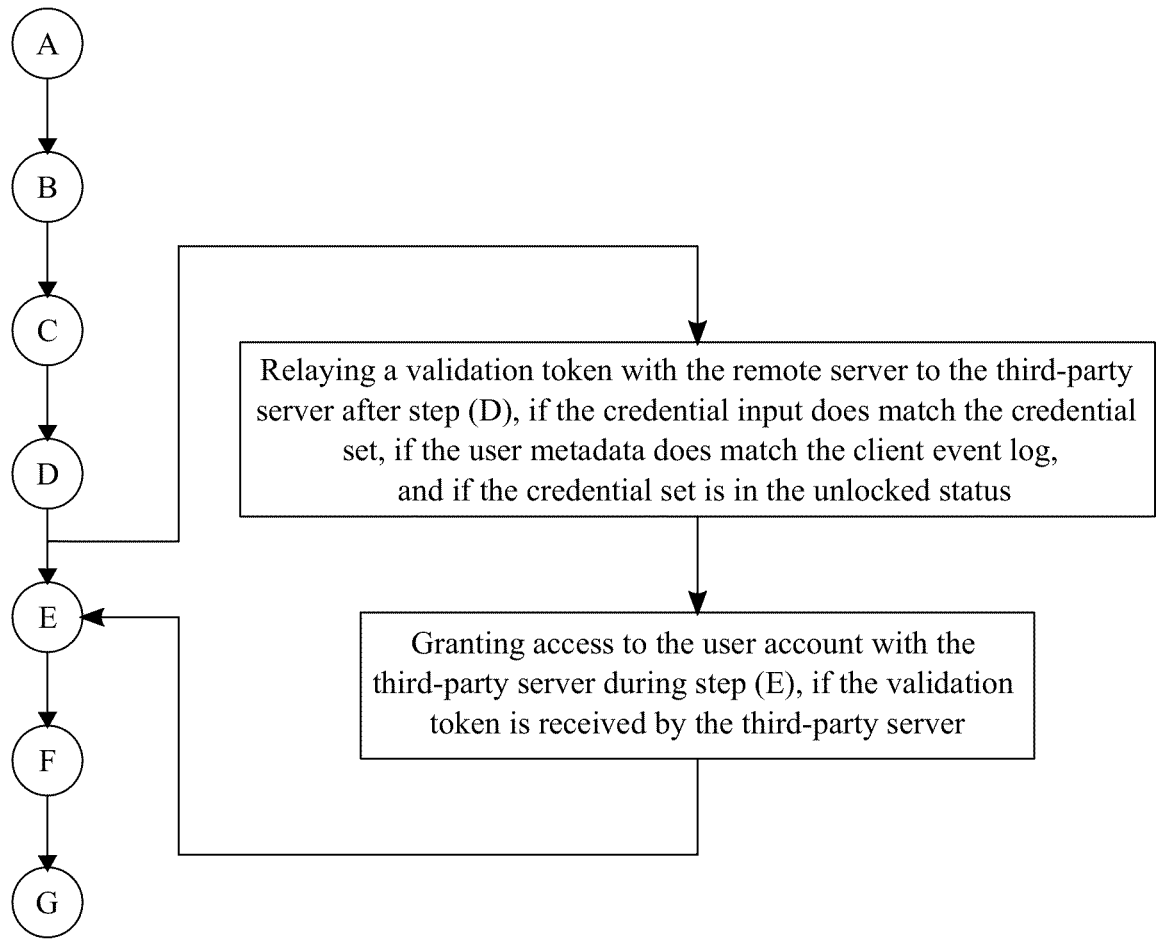
FIG. 10 is a flowchart illustrating the subprocess of the remote server validating the credential set, because the credential set is in the unlocked status, in order for the third-party server to grant access to the user account.

In order for the remote server to validate the credential set before authentication is processed by the third-party server and with reference to FIG. 10, the following subprocess is executed. Before the third-party server can authenticate the credential input provided by the client account, the third-party server requests a validation token from the remote server to check the status of the credential set. The validation token is relayed with the remote server to the third-party server after Step D, if the credential input does match the credential set, if the user metadata does match the client event log, and if the credential set is in the unlocked status. The third-party server can then proceed with the authentication process. The third-party server grants access to the user account during Step E, if the validation token is received by the third-party server. In further detail, access is granted because the credential input matches the credential set and the collected user metadata corresponds to the user profile by using the client event log. Therefore, the credential input passed the authentication process, and the credential set is validated to be in the unlocked status.

Figure 11:
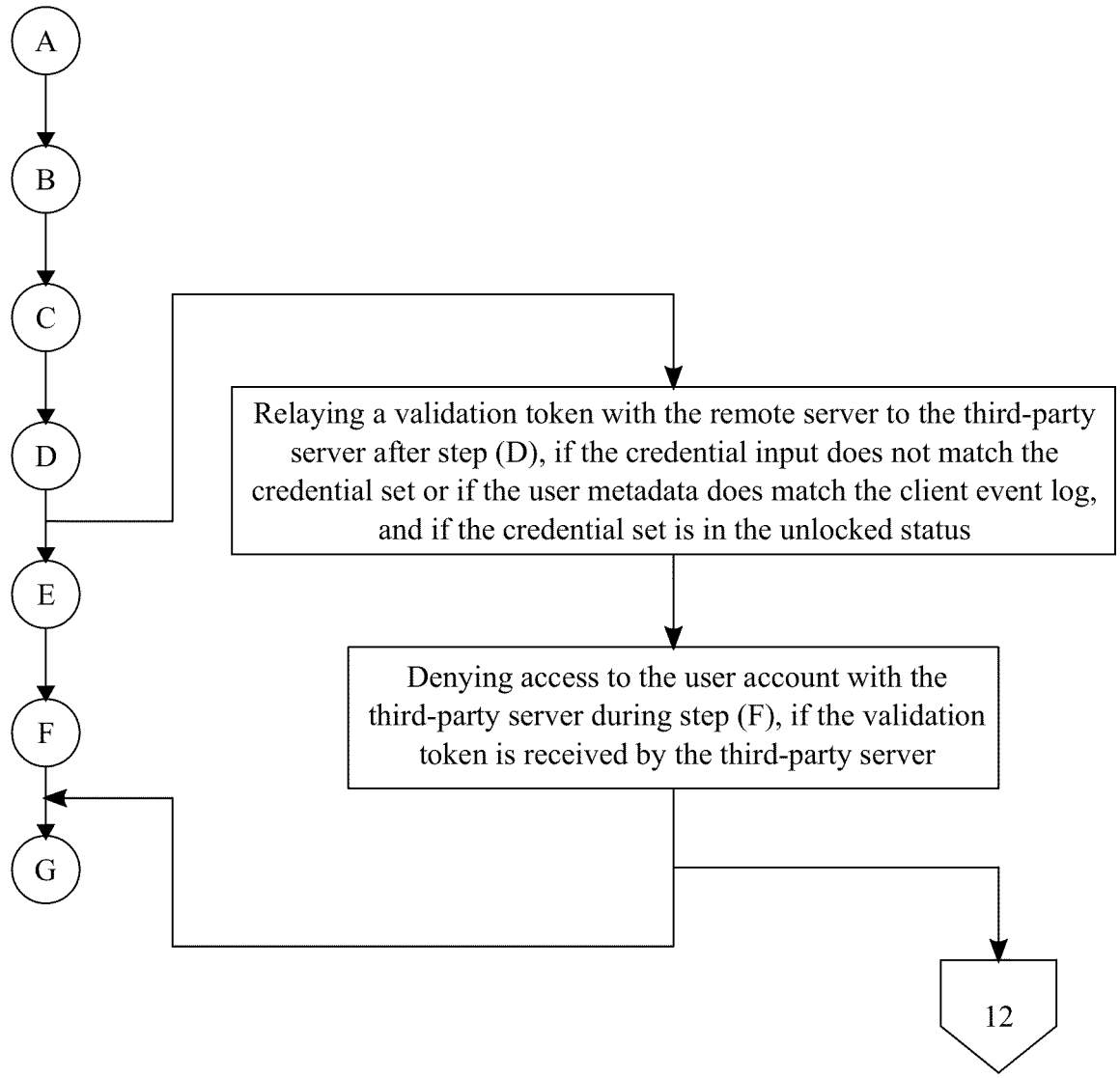
FIG. 11 is a flowchart illustrating the subprocess of the remote server validating the credential set, because the credential set is in the unlocked status, in order for the third-party server to deny access to the user account.
Figure 12:
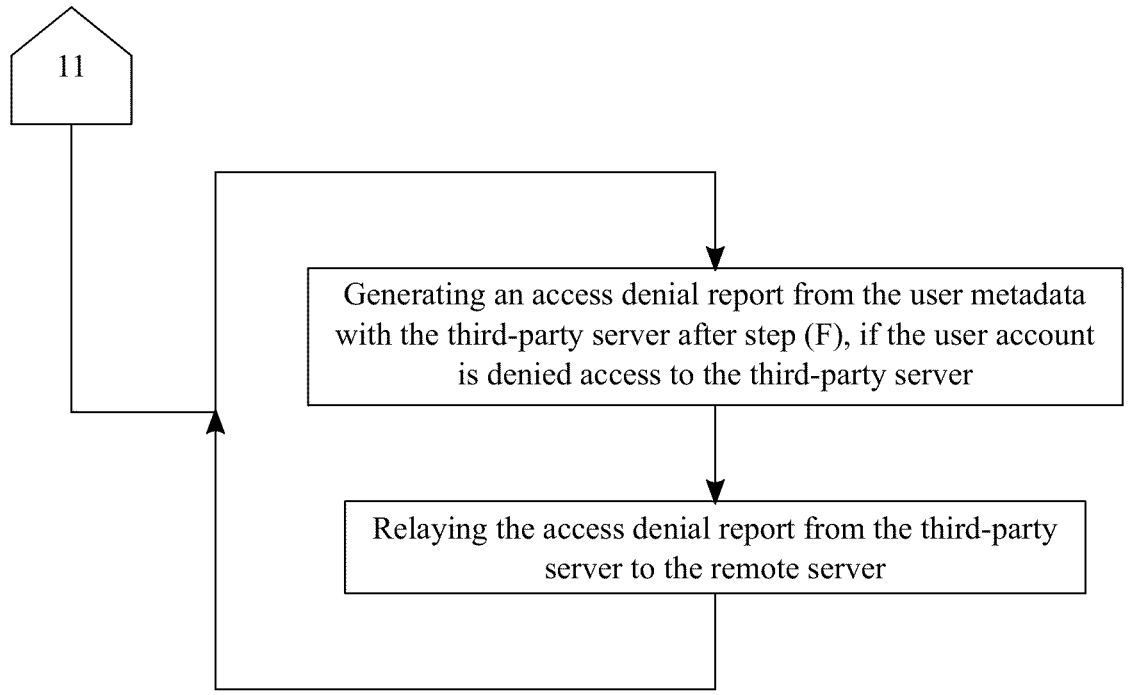
FIG. 12 is a flowchart illustrating the subprocess of the generating an access denial report if the third-party server denies access to the user account.

Alternatively, and with reference to FIGS. 11 and 12, the validation token is also relayed with the remote server to the third-party server after Step D, if the credential input does not match the credential set or if the user metadata does match the client event log, and if the credential set is in the unlocked status. In this situation, the user metadata analysis results in no inconsistencies but the credential input does not match the credential set. However, since the credential set is in the unlocked status, the third-party server can then proceed with the authentication process. The third-party server denies access to the user account during Step F, if the validation token is received by the third-party server, due to the credential input not matching the credential set. In further detail, access is denied because the credential input does not match the credential set, and therefore, the credential input failed the authentication preprocess, and the credential set was validated to be in the unlocked status. The service provider ensures this subprocess is legitimate by comparing the user metadata with the client event log. Furthermore, to keep the accuracy of the client event log up to date and to facilitate future automatic detection of fraudulent activities, the third-party server generates an access denial report from the user metadata after Step F, if the user account is denied access to the third-party server. The access denial report includes the user metadata relevant to the denied access that can be analyzed for future automatic detections of fraudulent activities. The access denial report is relayed from the third-party server to the remote server for processing and storage. From the remote server, the relevant parties can access the access denial report as necessary.

Figure 13:
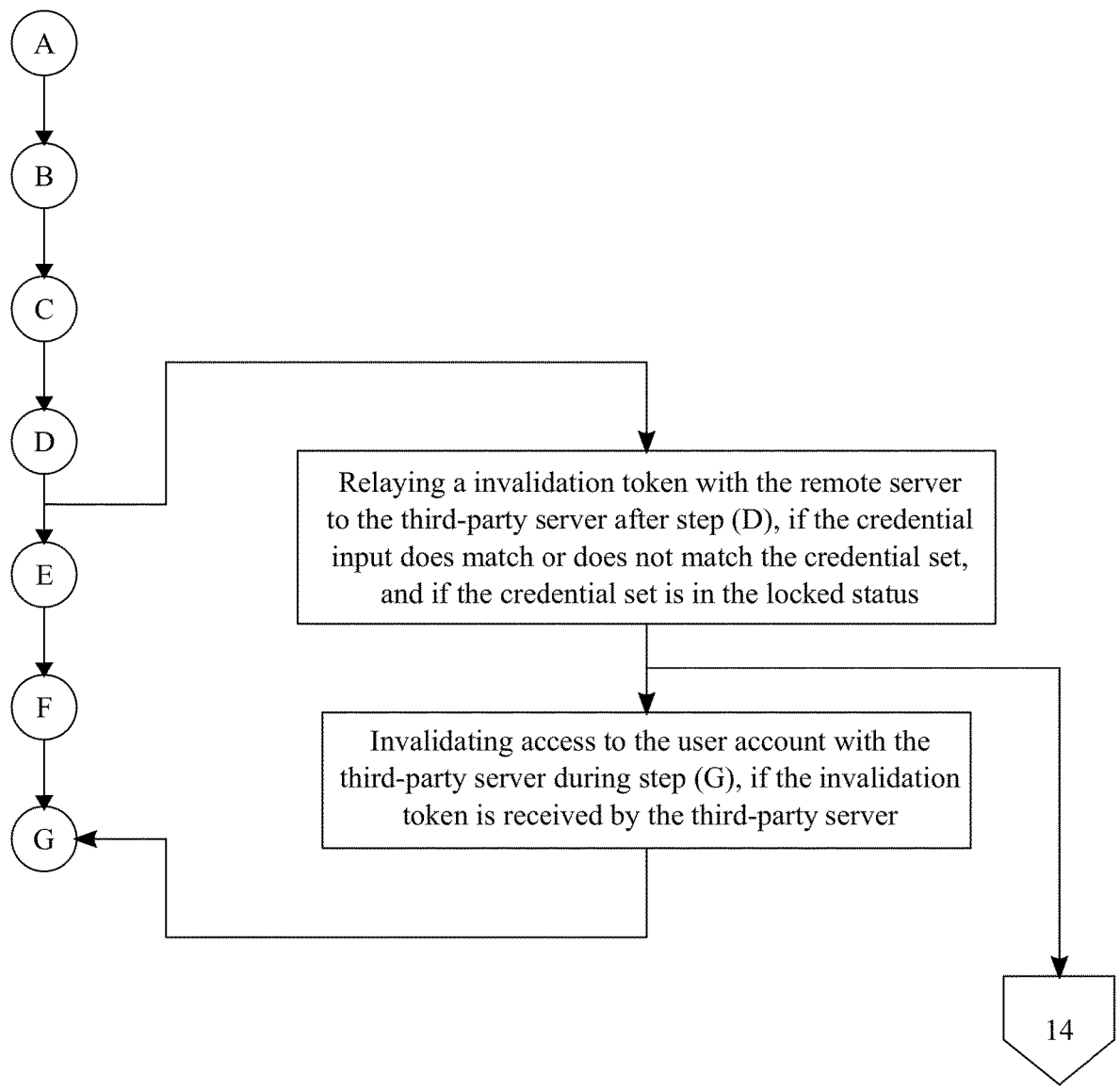
FIG. 13 is a flowchart illustrating the subprocess of the remote server invalidating the credential set, because the credential set is in the locked status, in order for the third-party server to invalidate access to the user account.
Figure 14:
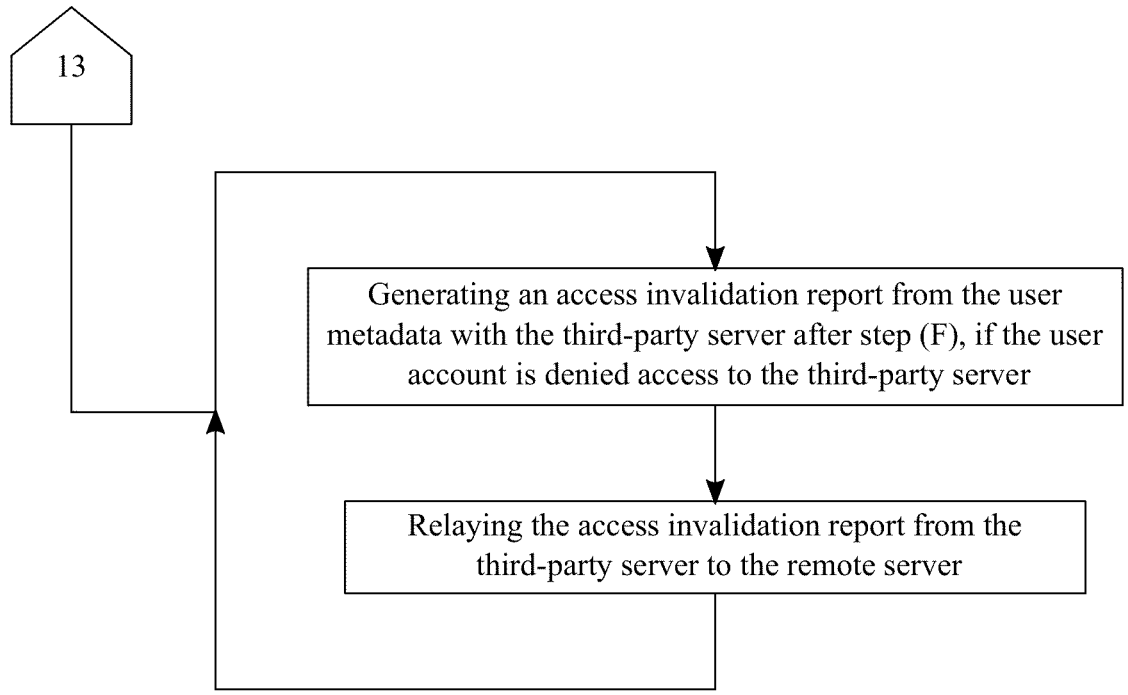
FIG. 14 is a flowchart illustrating the subprocess of the generating an access invalidation report if the third-party server invalidates access to the user account.

In order for the remote server to invalidate the credential set before authentication is processed by the third-party server, and with reference to FIGS. 13 and 14, the following subprocess is executed. Before the third-party server can authenticate the credential input provided by the client account, the third-party server requests a token from the remote server. An invalidation token is relayed with the remote server to the third-party server after Step D, if the credential input does match or does not match the credential set, and if the credential set is in the locked status. Since the credential set is in the locked status, the third-party server does not proceed with authentication process. The third-party server invalidates access to the user account during Step G, if the invalidation token is received by the third-party server. In further detail, the user account is prevented from being accessed altogether because the credential set is in the locked status. This prevents access to the client account even if the credential input matches the credential set and if the user metadata corresponds to the client event log. Furthermore, to keep the accuracy of the client event log up to date and to facilitate future automatic detection of fraudulent activities, the third-party server generates an access invalidation report from the user metadata after Step F, if the user account is denied access to the third-party server. The access invalidation report includes the user metadata relevant to the invalidated access that can be analyzed for future automatic detections of fraudulent activities. The access invalidation report is relayed from the third-party server to the remote server for processing and storage. From the remote server, the relevant parties can access the access denial report as necessary.

Figure 15:
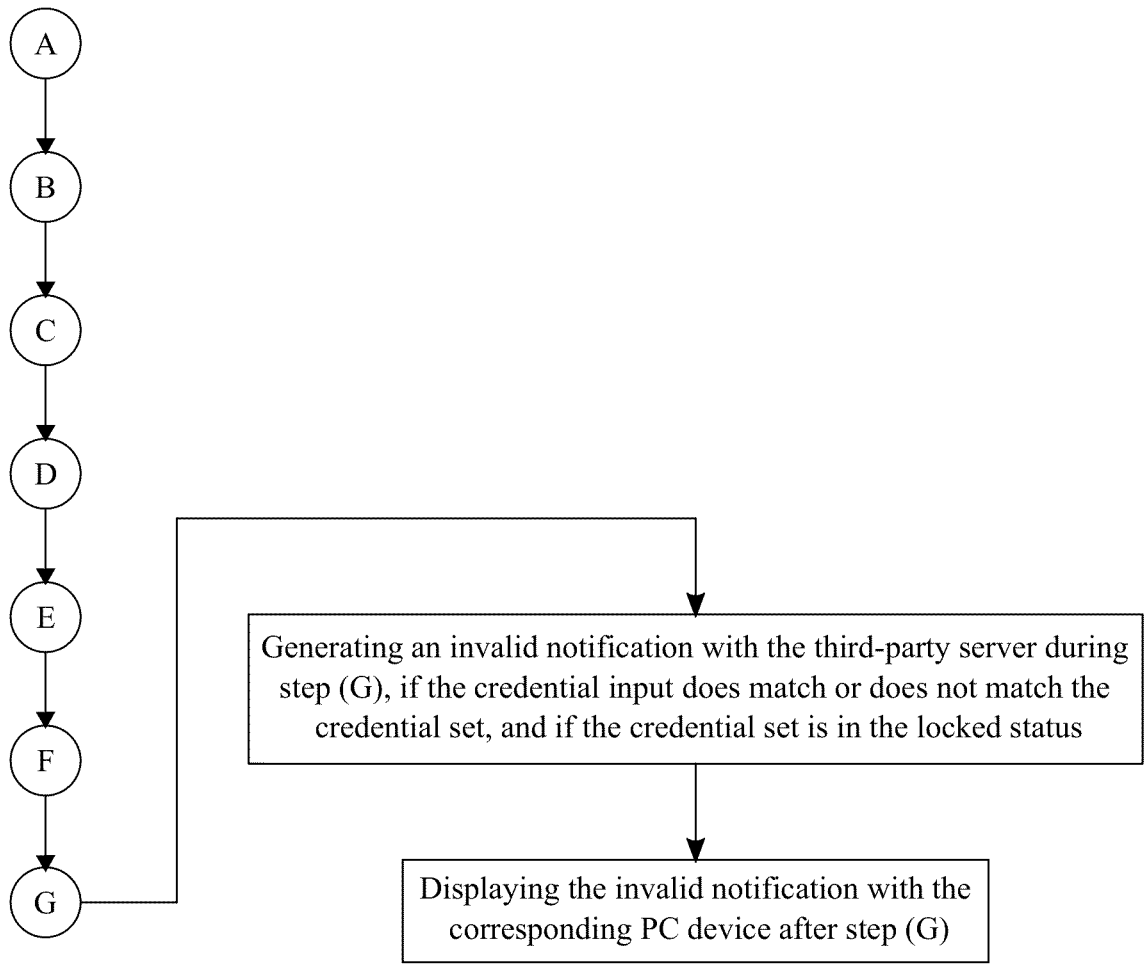
FIG. 15 is a flowchart illustrating the subprocess of displaying that the user account is invalid.

Moreover, and with reference to FIG. 15, the third-party server generates an invalid notification during Step G, if the credential input does match or does not match the credential set, and if the credential set is in the locked status. The invalid notification can be any type of notification such as, but not limited, an error message or an error website page which prevents access to the user account. The invalid notification is then displayed with the corresponding PC device after Step G. In further detail, the invalid notification can be displayed as a pop-up error message after the user is prevented access to the user account or the user is directed to an error website page.

Figure 16:
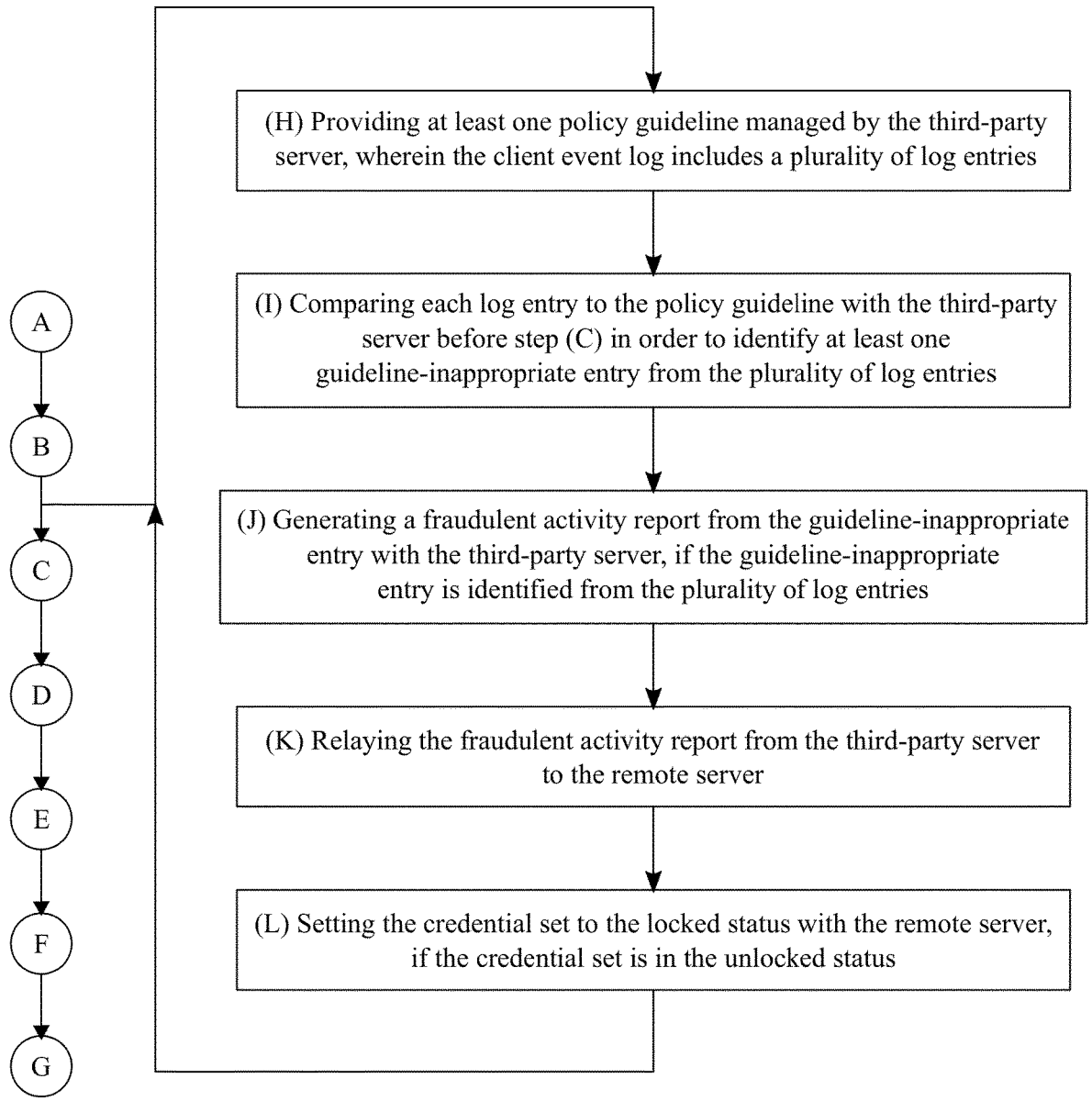
FIG. 16 is a flowchart illustrating the subprocess of modifying the policy guideline from automatic detections of guideline-inappropriate entries to automatically set the credential set to the locked status.

As previously discussed, the present invention facilitates the automatic detection of fraudulent activities during the account protection check so that the service provider can provide greater security to the client accounts. In reference to FIG. 16, to do so, the system of the present invention further includes at least one policy guideline managed by the third-party server (Step H). The policy guideline includes one or more set of rules that determine when the service provider must automatically block access the client account. Further, the client event log may include a plurality of log entries. Each log entry of the plurality of log entries corresponds to the various compilations of user metadata that occur when the user tries accessing the client account. The policy guideline provides policy management features that enable the service provider to predefine the parameters required to automatically block activity from detected fraudulent PC devices based on several parameters such as, but not limited to, IP address, IP address ranges, varying timeframes, varying geographic locations, specific user agents, specific software applications, and/or specific user/client accounts. The subprocess for facilitating the automatic detection of fraudulent activities starts by comparing each log entry to the policy guideline with the third-party server before Step C in order to identify at least one guideline-inappropriate entry from the plurality of log entries (Step I). This enables the service provider to automatically detect any possible fraudulent activities by comparing the user metadata with the previous collected metadata in the plurality of log entries. Then, the third-party server generates a fraudulent activity report from the guideline-inappropriate entry, if the guideline-inappropriate entry is identified from the plurality of log entries (Step J). The fraudulent activity report is relayed from the third-party server to the remote server (Step K) for storage and processing. Then, to protect the client account, the remote server automatically sets the credential set to the locked status, if the credential set is in the unlocked status (Step L). This way, the service provider is able to automatically detect potentially fraudulent activities and improve account protection services. For example, the service provider can return list and details of the identified fraudulent activities to external services, as well as to recommend actions to take based on the same parameters defined in the policy guidelines. For example, the service provider may call a firewall management Application Programming Interface (API) to create firewall rules dynamically, call another policy management system to create/modify a locking/enabling policy, or call intrusion detection systems to trigger for increased levels of activity monitoring.

Figure 17:
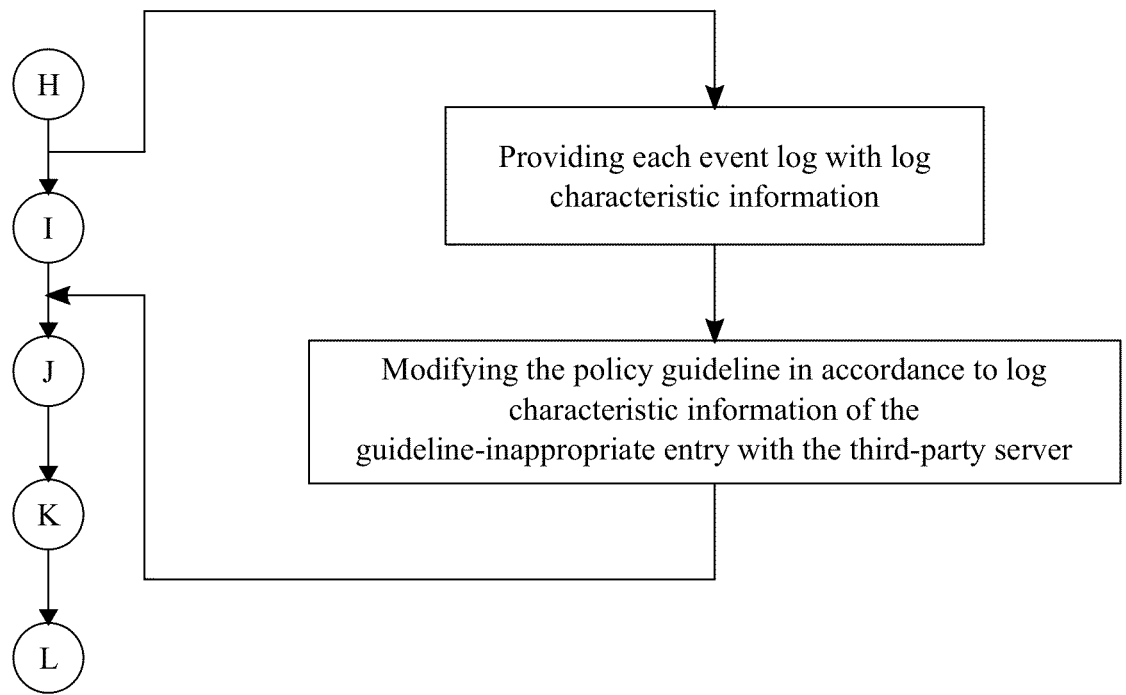
FIG. 17 is a flowchart illustrating the subprocess of modifying the policy guideline from log characteristic information of the guideline-inappropriate entry.
Figure 18:
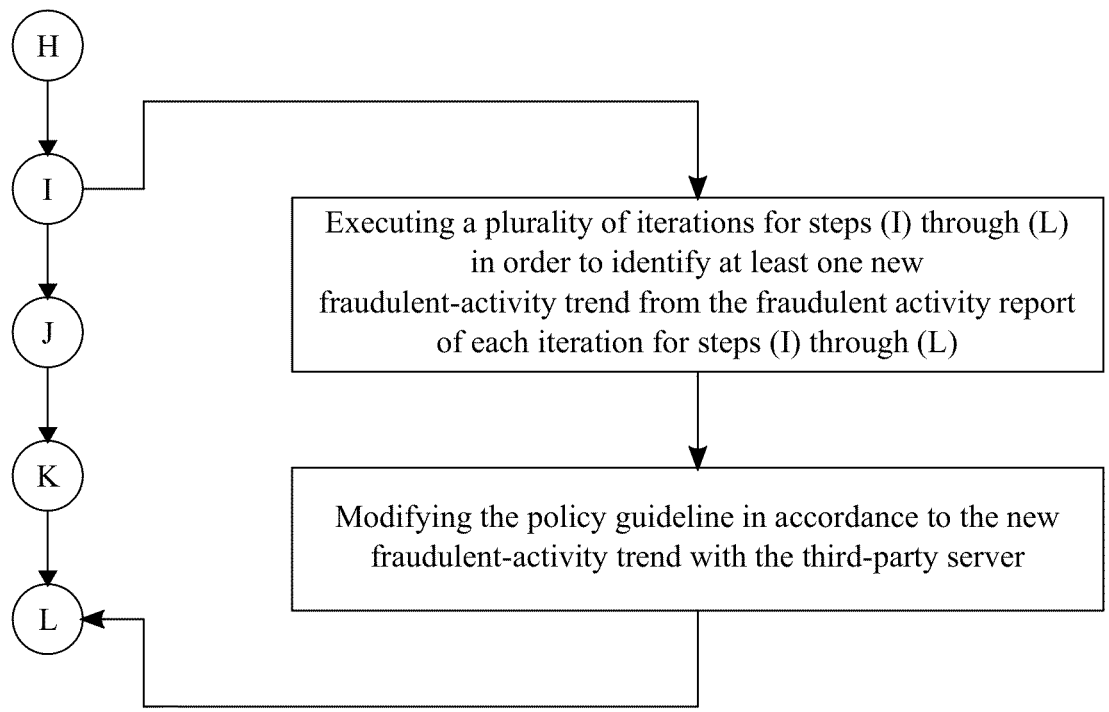
FIG. 18 is a flowchart illustrating the subprocess of modifying the policy guideline from fraudulent-activity trends identified from the fraudulent activity report.

In addition to automatically fraudulent activities, the present invention is able to improve the automatic detection capabilities through machine learning. In reference to FIGS. 17 and 18, to do so, each event log includes log characteristic information that can be used to determine potential new fraudulent behavior not previously detected by the present invention. Then, the third-party server modifies the appropriate policy guideline in accordance to log characteristic information of the guideline-inappropriate entry. This subprocess may be repeated continuously so that automatic detection capabilities are maintained up to date. To do so, a plurality of iterations for Steps I through L is executed in order to identify at least one new fraudulent-activity trend from the fraudulent activity report of each iteration for Steps I through L. Then, the third-party server modifies the policy guideline in accordance to the new fraudulent-activity trend anytime a new fraudulent behavior is detected in the log characteristic information. The continuous detection of fraudulent activities enables the reporting and analysis of PC devices, users, and geolocation activity from which potentially fraudulent activity is coming from over time. For example, the service provider can generate maps of locations/networks, list of PC devices, networks, software applications making requests, as well as geographic locations from which the fraudulent activity is coming from. Then, the service provider or external services may be able to filter any/all these fraudulent activity parameters, including time.

Exemplary Detection Algorithms

The present invention may utilize several algorithms/patterns to determine if activity is fraudulent in nature relying on the status of the credential set and the client event log. If multiple authentications originate from a single IP, a network, or a geolocation, and are made against multiple unique credential sets which are locked, this is an indication that the actor making the requests is attempting to authenticate credentials sets not owned by them. For example, a first IP address makes authentication attempts against account A which is locked, account B which is locked, and account C which is locked over the course of two minutes (within a configurable time window). The number of failed attempts based on the lock status and the time frame over which the authentication attempts occur are configurable. Another example, requests to authenticate a credential set/account come from a first IP address. If the account was locked/unlocked in the previous two minutes from a second IP address, this means that the locking or the unlocking attempts are not coming from the same host as the one attempting to authenticate. This is also an indication of potentially fraudulent activity.

Another detection algorithm involves account locking/unlocking calls which can be restricted to be allowed only from specific status constraints given IP address, IP Ranges, geographic locations, and during specific times. For example, only the supplied IP address is allowed to lock/unlock a given credential set. If an IP address, or range of unique IP addresses, make requests to lock/unlock credential sets against a range of accounts not previously associated with the account, then this is an indication that the lock/unlock activity is potentially fraudulent and future lock/unlock (and all other requests into other systems also) can be blocked or monitored with a finer degree of event logging based on policies or rules.

Another detection algorithm involves utilizing machine learning and Artificial Intelligence (AI). The service provider can apply probabilistic classifiers to automatically compute statistical matches classifying lock/unlock related activity as potentially fraudulent. For example, the service provider can leverage Bayesian statistics to automatically compare known successful lock/unlock and authentication patterns for credential sets against known failed attempts for a given IP, IP range, geographical location, or credential set. If an account is unlocked from a given IP address and authentication using a given credential set is successful, the service provider can infer that the user is validated successfully. If, however, a different IP address makes a request unsuccessfully against an unlocked/locked account or makes multiple unsuccessful authentication attempts (credentials supplied are invalid), then the service provider can infer that the user is invalid and block activity.

Another detection algorithm involves utilizing PC device characteristics and identifiers so that the service provider can register approved devices for each account. Unlock attempts from other devices can require additional levels of authentication. For example, a PC device that has never been used to unlock an account can cause an email or text message to be sent to the email or cell phone on file with a code that must be entered or a link that must be clicked to validate that the new PC device is trusted. For highly sensitive or shared accounts, policy guidelines can be set by the user or by the organization to which the user belongs to require an N number of approvals to unlock an account. These approvals can be required either from N number of people in the organization, users within a specific group, or specific named individuals. For example, to unlock certain administrative accounts in an enterprise, the organization can apply a policy that requires N number of approvals before the account can be unlocked. For a shared bank account, both parties would have to provide approval for the account to be unlocked.

Another detection algorithm involves utilizing thresholds that can be set for unlocked accounts which only allow the credentials sets to be used an N number of times before automatically locking again. These thresholds can be chosen by the end user or enforced via policy guidelines. Policy can specify any protection check or specify failed or successful if that information is being provided to the service. For example, upon unlocking an account, a user can choose the number of times the user expects to use the credential. If the expectation is one time and the user sets the threshold to one, then the credential set will automatically relock after the next account protection check. Another detection algorithm involves users or organizations able to choose to enforce a geography check on the account when the account is unlocked by setting the allowed geographic location(s) for the account or by setting a geography during the unlock process. This would prevent bad actors from using the credentials from other geographies while the accounts are unlocked.

Further, if information about a failed login attempt after protection check is being provided, the policy guideline can be set to automatically re-lock the account after a failed login. This would provide enhanced protection, but would require users to unlock the account again after a legitimate failed login. This policy guideline can be set per credential, for groups of credentials sets, or all credentials sets. Further, if certain credentials are only meant to be used in specific locations, and if the organization can provide details from their access control system on when users have badged in and out of the location, then the credential sets can be restricted from being unlocked if the user is not badged into the building. Alternatively, the policy can be set to automatically lock and unlock the accounts when the users enter and exit the location. Further, the policy guideline can be set to require multi-function authentication to lock or unlock specific credential sets or groups of credential sets.

Although the invention has been explained in relation to its preferred embodiment, it is to be understood that many other possible modifications and variations can be made without departing from the spirit and scope of the invention as hereinafter claimed.

What is claimed is:

1. A method for facilitating an account protection check for sets of credentials, the method comprising the steps of:
  (A) providing at least one client account managed by at least one remote server, wherein the client account is associated with a corresponding personal computing (PC) device, and wherein a client event log for the client account is managed by the remote server;
  (B) providing at least one user account managed by at least one third-party server, wherein the user account is associated with the corresponding PC device, and wherein the user account includes a credential set, and wherein the user account is associated to the client account, and wherein the credential set is either in an unlocked status or a locked status, and wherein user metadata for the user account is managed by the third-party server;
  (C) prompting the client account to enter a credential input for the user account with the corresponding PC device;
  (D) relaying the credential input and the user metadata from the corresponding PC device, through the third-party server, and to the remote server, if the credential input is entered by the client account;
  (E) granting access to the user account with the third-party server, if the credential input does match the credential set, and if the user metadata does match the client event log, and if the credential set is in the unlocked status;

(F) denying access to the user account with the third-party server, if the credential input does not match the credential set or if the client metadata does match the client event log, and if the credential set is in the unlocked status; and (G) invalidating access to the user account with the third-party server, if the credential input does match or does not match the credential set, and if the credential set is in the locked status.

2. The method as claimed in claim 1 comprising the steps of:

prompting the client account to link to the user account with the corresponding PC device during step (B); and generating an association between the user account and the client account with the remote server, if the user account is selected to be linked to the client account.

3. The method as claimed in claim 1 comprising the steps of:

prompting the client account to enter a single status selection for the credential set with the corresponding PC device;

relaying the single status selection from the corresponding PC device to the remote server, if the single status selection is entered by the client account;

setting the credential set to the unlocked status with the remote server, if the single status selection is for the unlocked status; and setting the credential set to the locked status with the remote server, if the single status selection is for the locked status.

4. The method as claimed in claim 1 comprising the steps of:

providing at least one user account as a plurality of user accounts;

prompting the client account to enter a group status selection for the credential set of each user account with the corresponding PC device;

relaying the group status selection from the corresponding PC device to the remote server, if the group status selection is entered by the client account;

setting the credential set of each user account to the unlocked status with the remote server, if the group status selection is for the unlocked status; and setting the credential set of each user account to the locked status with the remote server, if the group status selection is for the locked status.

5. The method as claimed in claim 1 comprising the steps of:

providing at least one administrator account managed by the third-party server, wherein the administrator account includes a status selection ability;

prompting the administrator account to enter a single status selection for the credential set with the third-party server;

relaying the single status selection from the third-party server to the remote server, if the single status selection is entered by the administrator account;

setting the credential set to the unlocked status with the remote server, if the single status selection is for the unlocked status; and setting the credential set to the locked status with the remote server, if the single status selection is for the locked status.

6. The method as claimed in claim 5 comprising the steps of:

prompting the client account to grant the status selection ability to the administrator account with the corresponding PC device; and relaying a client token from the remote server to the third-party server, if the status selection ability for the administrator account is granted by the client account.

7. The method as claimed in claim 1 comprising the steps of:

providing the credential set in the unlocked status;

prompting the client account to enter at least one status constraint for the unlocked status with the corresponding PC device;

relaying the status constraint from the corresponding PC device to the remote server, if the status constraint is entered by the client account;

maintaining the credential set in the unlocked status with the remote server, if the unlocked status is inside the status constraint; and setting the credential set from the unlocked status to the locked status with the remote server, if the unlocked status is outside the status constraint.

8. The method as claimed in claim 1 comprising the steps of:

providing the credential set in the locked status;

prompting the client account to enter at least one status constraint for the locked status with the corresponding PC device;

relaying the status constraint from the corresponding PC device to the remote server, if the status constraint is entered by the client account;

maintaining the credential set in the locked status with the remote server, if the locked status is inside the status constraint; and setting the credential set from the locked status to the unlocked status with the remote server, if the locked status is outside the status constraint.

9. The method as claimed in claim 1 comprising the steps of:

relaying a validation token with the remote server to the third-party server after step (D), if the credential input does match the credential set, if the user metadata does match the client event log, and if the credential set is in the unlocked status; and granting access to the user account with the third-party server during step (E), if the validation token is received by the third-party server.

10. The method as claimed in claim 1 comprising the steps of:

relaying a validation token with the remote server to the third-party server after step (D), if the credential input does not match the credential set or if the user metadata does match the client event log, and if the credential set is in the unlocked status; and denying access to the user account with the third-party server during step (F), if the validation token is received by the third-party server.

11. The method as claimed in claim 10 comprising the steps of:

generating an access denial report from the user metadata with the third-party server after step (F), if the user account is denied access to the third-party server; and relaying the access denial report from the third-party server to the remote server.

12. The method as claimed in claim 1 comprising the steps of:

relaying an invalidation token with the remote server to the third-party server after step (D), if the credential input does match or does not match the credential set, and if the credential set is in the locked status; and invalidating access to the user account with the third-party server during step (G), if the invalidation token is received by the third-party server.

13. The method as claimed in claim 12 comprising the steps of:

generating an access invalidation report from the user metadata with the third-party server after step (F), if the user account is denied access to the third-party server; and relaying the access invalidation report from the third-party server to the remote server.

14. The method as claimed in claim 1 comprising the steps of:

generating an invalid notification with the third-party server during step (G), if the credential input does match or does not match the credential set, and if the credential set is in the locked status; and displaying the invalid notification with the corresponding PC device after step (G).

15. The method as claimed in claim 1 comprising the steps of:

(H) providing at least one policy guideline managed by the third-party server, wherein the client event log includes a plurality of log entries;

(I) comparing each log entry to the policy guideline with the third-party server before step (C) in order to identify at least one guideline-inappropriate entry from the plurality of log entries;

(J) generating a fraudulent activity report from the guideline-inappropriate entry with the third-party server, if the guideline-inappropriate entry is identified from the plurality of log entries;

(K) relaying the fraudulent activity report from the third-party server to the remote server; and (L) setting the credential set to the locked status with the remote server, if the credential set is in the unlocked status.

16. The method as claimed in claim 15 comprising the steps of:

providing each event log with log characteristic information; and modifying the policy guideline in accordance to log characteristic information of the guideline-inappropriate entry with the third-party server.

17. The method as claimed in claim 15 comprising the steps of:

executing a plurality of iterations for steps (I) through (L) in order to identify at least one new fraudulent-activity trend from the fraudulent activity report of each iteration for steps (I) through (L); and modifying the policy guideline in accordance to the new fraudulent-activity trend with the third-party server.

* * * * *